(12) United States Patent
Chi et al.

(10) Patent No.: US 8,679,217 B2
(45) Date of Patent: Mar. 25, 2014

(54) PLEATED NANOWEB STRUCTURES

(75) Inventors: Cheng-Hang Chi, Midlothian, VA (US); Hyun Sung Lim, Milothian, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 807 days.

(21) Appl. No.: 11/899,803

(22) Filed: Sep. 7, 2007

(65) Prior Publication Data

US 2009/0064648 A1    Mar. 12, 2009

(51) Int. Cl.
*B01D 46/10* (2006.01)

(52) U.S. Cl.
CPC ...................................... *B01D 46/10* (2013.01)
USPC .................... 55/486; 55/521; 55/527; 55/528

(58) Field of Classification Search
CPC ................................ B01D 46/10; B01D 29/15
USPC ........... 55/486, 487, 488, 489, 522, 490–519, 55/527, 521; 95/273–287; 210/323.1–510.1
See application file for complete search history.

(56) References Cited

U.S. PATENT DOCUMENTS

| | | |
|---|---|---|
| 425,189 A | 4/1890 | Shaw |
| 3,531,920 A | 10/1970 | Hart |
| 4,127,706 A | 11/1978 | Martin et al. |
| 4,536,361 A | 8/1985 | Torobin |
| 4,720,292 A | 1/1988 | Engel et al. |
| 5,082,476 A | 1/1992 | Kahlbaugh et al. |
| 5,820,646 A | 10/1998 | Gillingham et al. |
| 6,183,670 B1 | 2/2001 | Torobin et al. |
| 6,315,806 B1 | 11/2001 | Torobin et al. |
| 6,382,526 B1 | 5/2002 | Reneker et al. |
| 6,520,425 B1 | 2/2003 | Reneker |
| 6,695,992 B2 | 2/2004 | Reneker |
| 6,872,431 B2 | 3/2005 | Kahlbaugh et al. |
| 2004/0065066 A1 * | 4/2004 | Mertz et al. ...................... 55/486 |
| 2004/0112023 A1 * | 6/2004 | Choi ................................ 55/486 |
| 2005/0163955 A1 * | 7/2005 | Schaefer et al. ............. 428/36.1 |
| 2005/0210846 A1 * | 9/2005 | Miyagishima et al. ......... 55/498 |
| 2006/0084340 A1 | 4/2006 | Bond et al. |
| 2006/0137317 A1 | 6/2006 | Bryner et al. |

FOREIGN PATENT DOCUMENTS

| | | |
|---|---|---|
| DE | 19630522 C2 | 2/1998 |
| EP | 0429805 B1 | 10/1990 |
| WO | WO 99/26711 | 6/1999 |
| WO | WO 03/080905 A1 | 10/2003 |
| WO | WO 2006/071979 | 7/2006 |

OTHER PUBLICATIONS

PCT International Search Report and Written Opinion for International Application No. PCT/US2008/075571 dated Sep. 8, 2008.

* cited by examiner

*Primary Examiner* — Duane Smith
*Assistant Examiner* — Thomas McKenzie

(57) ABSTRACT

A filter including a filter medium with a pleated structure. The medium includes a nanoweb layer and a scrim, wherein the nanoweb layer contains fibers with a number average diameter less than 1 micron and layer thickness less than 50 microns. The ratio of total medium thickness-to-pleat spacing is less than 0.15 and the nanoweb layer has a basis weight of more than about 0.6 gsm. The nonwoven scrim can be a spunbond web, a dry-laid web, a wet-laid web, a cellulose fiber web, a melt blown web and a glass fiber web.

6 Claims, 2 Drawing Sheets

PLEATED NANOWEB STRUCTURES

FIELD OF THE INVENTION

The invention relates to a filter medium and filter structures that can be used generally in filtration applications including in a vacuum cleaner, a dust collector, a gas turbine inlet air filter system, a heating, ventilating, and air conditioning filter system, or a variety of other applications to remove dust, dirt, and other particulate from a gaseous or contaminated air stream.

BACKGROUND

Gas streams often carry particulate material. In many instances, it is desirable to remove some or all of the particulate material from a gas flow stream. For example, air intake streams to engines for motorized vehicles or power generation equipment, gas streams directed to gas turbines, and air streams to various combustion furnaces, often include entrained particulate material. The particulate material, should it reach the internal workings of the various mechanisms involved, can cause substantial damage. Removal of the particulate material from the gas flow upstream of the engine, turbine, furnace, or other equipment involved is often needed. Another example is the commercial and residential heating, ventilating, and air conditioning (HVAC) filter system. Air streams to HVAC system often carry particulate material such as pollens, spores, atmospheric dust, and other sub-micron particles. Removal of the particulate material is desirable to reduce allergic reaction as well as potential health risks.

In filtration applications, it is commonly known to pleat the filter medium in order to increase the effective surface area available for fluid impact. The melt-blown synthetic media producers combine an electrostatically charged microfiber web with a scrim support layer to achieve acceptable initial filtration efficiency and filter resistance. If the microfiber web is melt blown, then the melt-blown layer typically consists of 15-40 gsm fiber of 1-5 microns in diameter and thickness of layer is about 0.2-0.4 mm. There are deficiencies to this kind of product. The total thickness of media is typically greater than 0.6 mm, which once pleated the thickness contributes to flow resistance. As the melt-blown layer is relatively thick, the flow pattern through the layer is not completely perpendicular to the layer and the tangential flow could result in higher resistance. Media that are initially charged typically lose electrostatic charge due to heat, humidity, and dust accumulation, which results in decrease in filtration efficiency.

The present invention overcomes the limitations associated with the flow resistance in pleated melt blown structures, and the decrease in efficiency with use associated with charged media.

SUMMARY OF THE INVENTION

The present invention is directed towards a filter comprising a filter medium with a pleated structure comprising a nanoweb layer and a scrim, wherein the nanoweb layer comprises fibers with a number average diameter less than 1 micron and layer thickness less than 50 microns, wherein the ratio of total medium thickness-to-pleat-spacing is less than 0.15, wherein the nanoweb layer has a basis weight of more than about 0.6 gsm and wherein the scrim is a nonwoven made of fibers selected from the group consisting of spunbond fibers, dry-laid fibers, wet-laid fibers, cellulose fibers, melt blown fibers, glass fibers, and blends thereof.

DETAILED DESCRIPTION OF THE INVENTION

Figure 1:
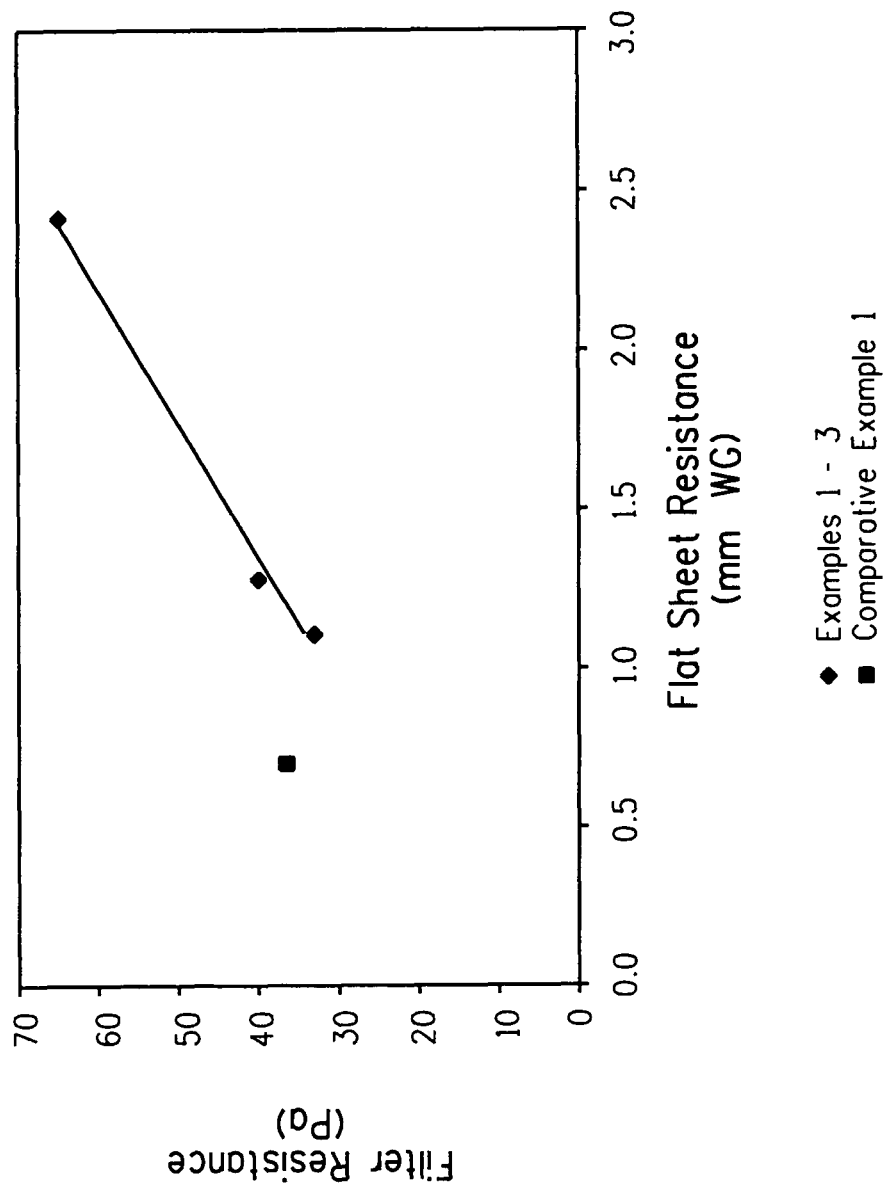
FIG. 1 shows a plot of filter resistance versus flat sheet resistance for Comparative Example 1 and Examples 1, 2 and 3.

The terms "nanoweb" and "nanofiber web" as used herein are synonymous. Similarly the terms "scrim" and "substrate" are synonymous.

As used herein, the term "nonwoven web" or "nonwoven material" means a web having a structure of individual fibers, filaments, or threads which are interlaid, but not in a regular or identifiable manner such as those in a knitted fabric or films that have been fibrillated. Nonwoven webs or materials have been formed from many processes such as, for example, meltblowing processes, spunbonding processes, and bonded carded web processes. The basis weight of nonwoven webs or materials is usually expressed in ounces of material per square yard (osy) or grams per square meter (gsm), and the fiber diameters usable are usually expressed in microns.

A "scrim" is a support layer and can be any planar structure with which the nanoweb can be bonded, adhered, or laminated. Advantageously, the scrim layers useful in the present invention are spunbond nonwoven layers, but can be made from carded webs of nonwoven fibers and the like. Scrim layers useful for some filter applications require sufficient stiffness to hold pleats and dead folds.

The term "nanofiber" as used herein refers to fibers having a number average diameter or cross-section less than about 1000 nm, even less than about 800 nm, even between about 50 nm and 500 nm, and even between about 100 and 400 nm. The term diameter as used herein includes the greatest cross-section of non-round shapes.

The term "nanoweb" refers to a nonwoven web that comprises nanofibers.

"Pleat spacing" is the distance between peak-to-peak or valley-to-valley in a pleated structure.

The invention is directed to a filter comprising a media with a pleated structure. The pleated structure comprises a nanoweb layer comprising fibers with a number average of diameter less than 1 micron and layer thickness less than 50 microns in which the ratio of total media thickness to pleat spacing of less than 0.15.

In a further embodiment the filter further comprises a scrim bonded to the nanoweb layer. The scrim may further comprise a nonwoven comprising spunbond fiber, dry-laid or wet-laid fiber, cellulose fiber, melt blown fiber, glass fiber, or blends thereof.

The as-spun nonwoven web comprises primarily or exclusively nanofibers that can be produced by electrospinning, such as classical electrospinning or electroblowing, and in certain circumstances, by meltblowing processes. Classical electrospinning is a technique illustrated in U.S. Pat. No. 4,127,706, incorporated herein in its entirety, wherein a high voltage is applied to a polymer in solution to create nanofibers and nonwoven mats. However, total throughput in electrospinning processes is too low to be commercially viable in forming heavier basis weight webs.

The "electroblowing" process overcomes the throughput limitations of the electrospinning process and is disclosed in World Patent Publication No. WO 03/080905, incorporated herein by reference in its entirety. The electroblowing process permits formation of commercial sizes and quantities of nanowebs at basis weights in excess of about 1 gsm, even as high as about 40 gsm or greater, in a relatively short time period.

A substrate or scrim can be arranged on the collector to collect and combine the nanofiber web spun on the substrate, so that the combined fiber web is used as a high-performance filter, wiper and so on. Examples of the substrate may include various nonwoven cloths, such as meltblown nonwoven cloth, needle-punched or spunlaced nonwoven cloth, woven cloth, knitted cloth, paper, and the like, and can be used without limitations so long as a nanofiber layer can be added on the substrate. The nonwoven cloth can comprise spunbond fibers, dry-laid or wet-laid fibers, cellulose fibers, melt blown fibers, glass fibers, or blends thereof.

Nanofibers used in the present invention can include fibers made from a polymer melt. Methods for producing nanofibers from polymer melts are described for example in U.S. Pat. No. 6,520,425; U.S. Pat. No. 6,695,992; and U.S. Pat. No. 6,382,526 to the University of Akron, U.S. Pat. No. 6,183,670; U.S. Pat. No. 6,315,806; and U.S. Pat. No. 4,536,361 to Torobin et al., and U.S. publication number 2006/0084340.

Polymers that can be used in forming the nanowebs of the invention are not particularly limited and include both addition polymer and condensation polymers, such as, polyacetal, polyamide, polyester, cellulose ether and ester, polyalkylene sulfide, polyarylene oxide, polysulfone, modified polysulfone polymers, and mixtures thereof. Preferred polymers that fall within these generic classes include, poly(vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms. Preferred addition polymers tend to be glassy (a $T_g$ greater than room temperature). This is the case for polyvinylchloride and polymethylmethacrylate, polystyrene polymer compositions or alloys or low in crystallinity for polyvinylidene fluoride and polyvinyl alcohol materials. One preferred class of polyamide condensation polymers are nylon materials, such as nylon-6, nylon-6,6, nylon 6,6-6,10, and the like. When the polymer nanowebs of the invention are formed by meltblowing, any thermoplastic polymer capable of being meltblown into nanofibers can be used, including polyolefins, such as polyethylene, polypropylene and polybutylene, polyesters such as poly(ethylene terephthalate) and polyamides, such as the nylon polymers listed above.

It can be advantageous to add known-in-the-art plasticizers to the various polymers described above, in order to reduce the $T_g$ of the fiber polymer. Suitable plasticizers will depend upon the polymer to be electrospun or electroblown, as well as upon the particular end use into which the nanoweb will be introduced. For example, nylon polymers can be plasticized with water or even residual solvent remaining from the electrospinning or electroblowing process. Other known-in-the-art plasticizers which can be useful in lowering polymer $T_g$ include, but are not limited to aliphatic glycols, aromatic sulphanomides, phthalate esters, including but not limited to those selected from the group consisting of dibutyl phthalate, dihexyl phthalate, dicyclohexyl phthalate, dioctyl phthalate, diisodecyl phthalate, diundecyl phthalate, didodecanyl phthalate, and diphenyl phthalate, and the like. *The Handbook of Plasticizers*, edited by George Wypych, 2004 Chemtec Publishing, incorporated herein by reference, discloses other polymer/plasticizer combinations which can be used in the present invention.

The invention can be used in the form of a flat panel or cylindrical unit in a variety of filtering method applications. Such applications include filtering both gaseous and liquid flows, dust removal, automotive, and other transportation applications (including both wheeled vehicles and filtration applications in aircraft equipment), filtration of gas turbine intake power station streams, filtering room air for military, residential, industrial, and healthcare, semiconductor manufacture and other applications where reduction of small particulate is important for health, effective production, cleanliness, safety, or other important purposes, filtering air streams in military applications for the purpose of removing biohazard or chemhazard materials from the local environment, filtration for closed ventilation equipment, used, for example, in a space shuttle, aircraft air recirculation, submarines, clean rooms, and other such closed applications as a high efficiency filter in respirator devices used by public service/safety personnel such as police and fire, military personnel, civilian populations, hospital populations, industrial workers, and others requiring a high degree of efficiency in removing small particulate from inhaled atmospheres.

Various filter designs are shown in patents disclosing and claiming various aspects of filter structure and structures used with the filter materials. Engel et al., U.S. Pat. No. 4,720,292, disclose a radial seal design for a filter assembly having a generally cylindrical filter element design, the filter element being sealed by a relatively soft, rubber-like end cap having a cylindrical, radially inwardly facing surface. Kahlbaugh et al., U.S. Pat. No. 5,082,476, disclose a filter design using a depth media comprising a foam substrate with pleated components combined with the microfiber materials of the invention. Gillingham et al., U.S. Pat. No. 5,820,646, disclose a Z-filter structure that uses a specific pleated filter design involving plugged passages that require a fluid stream to pass through at least one layer of filter media in a "Z" shaped path to obtain proper filtering performance. The filter media formed into the pleated Z-shaped format can contain the fine fiber media of the invention. Lastly, Gillingham, U.S. Des. Pat. No. 425,189, discloses a panel filter using the Z-filter design.

Pleating can be carried out by any method known to one skilled in the art. For example, a method for producing a pleated filter medium with stamped protrusions is described in U.S. Pat. No. 3,531,920. According to this method, the filter material is passed from a roll to a press which includes two heated cylinders rotating in opposite directions. The cylinders are provided with meshing protrusions and the corresponding recesses, and the filter material passed through between them is durably shaped by deep-drawing. The shaping process influences the structure of the filter material in the deep-drawn area, and thereby changes the original filtering properties in the areas important to the filtering.

An improvement in the method described above is achieved by the method described in European Published Patent Application No. 0 429 805. In this method, a flat filter medium is gathered transversely to the running direction by rolls, and subsequently, elongated protrusions are stamped into the gathered material by the dies of a shaping device. The gathering prevents the additional material, required by the stamped protrusions, from leading to tensions in the material and the structure from being changed in the deep-drawn area of the filter medium.

German Published Patent Application No. 196 30 522 describes scoring and bonding a formed fabric made of stretched and unstretched synthetic fibers between profiled calendar rolls. By this method a filter material could be produced from a nonwoven fabric without having a change in the homogeneity of the nonwoven fabric appearance.

There are two general type of pleaters; blade and rotary. The operation of the blade pleater involves preheating the web followed by two blades which in up and down movements create pleats. A post heated zone under pressure is used to stabilize pleats. The operation of a rotary pleater involves scoring the media with a rotary-knife and folding the scoring line to form a pleat under pressure.

The invention can now best be understood by the examples below.

TEST METHODS

Basis Weight (BW) was determined by ASTM D-3776, which is hereby incorporated by reference and reported in g/m$^2$ (gsm).

Fiber Diameter was determined as follows. Ten scanning electron microscope (SEM) images at 5,000× magnification were taken of each fine fiber layer sample. The diameter of eleven (11) clearly distinguishable fine fibers were measured from the photographs and recorded. Defects were not included (i.e., lumps of fine fibers, polymer drops, intersections of fine fibers). The average (mean) fiber diameter for each sample was calculated.

Web air flow permeability is commonly measured using the Frazier measurement (ASTM D737). In this measurement, a pressure difference of 124.5 N/m$^2$ (0.5 inches of water column) is applied to a suitably clamped fabric sample and the resultant air flow rate is measured as Frazier permeability or more simply as "Frazier". Herein, Frazier permeability is reported in units of m$^3$/m$^2$/min. High Frazier corresponds to high air flow permeability and low Frazier corresponds to low air flow permeability.

Web thickness is measured using scanning electron microscope or digital optical microscope. A clean cross-sectional cut of the sample was made and five (5) thickness measurements were used to calculate the average value which is reported in units of mm or micron.

Flat sheet resistance was measured by Fractional Efficiency Filter Tester (TSI Model No. 3160 or 8130). The flow resistance is measured at an air flow rate of 5.3 cm/s and is reported in units of mm water gauge (W.G.). High resistance corresponds to high pressure drop across the flat sheet media at a fixed flow rate.

Filter resistance was measured by two different methods. The cabin air filters were tested per ISO Test Specification 11155-1 (2001), "Road Vehicles—Air Filters for Passenger Compartments—Part 1: Test for Particulate Filtration". The filter is mounted in a vertical duct and the flow resistance across the filter is measured at an air flow rate of 170 m$^3$/h. The HVAC filters were tested per ASHRAE Standard 52.2-1999, "Method of Testing General Ventilation Air-Cleaning Devices for Removal Efficiency by Particle Size." ASHRAE is the abbreviation for American Society of Heating, Refrigerating and Air-conditioning Engineers, Inc. The nominally 610 mm (length)×610 mm (width)×305 mm (depth) filter is mounted in a horizontal duct conforming to the ASHRAE 52.2 test standard. The flow resistance across the filter is measured at an air flow rate of 3344 m$^3$/h and is reported in units of inch water gauge and converted to units of Pascal.

HVAC filter efficiency was measured before and after potassium chloride (KCl) particle conditioning steps to reveal the drop in filtration efficiency that some filters undergo during actual use. It was carried out per the Proposed "Addenda a" to ASHRAE Standard 52.2-2007, Public Review Drafts, Mar. 1, 2007, hereby incorporated herein by reference. The filter is conditioned by circulating 0.02 micron diameter potassium chloride particles at a density of 3.6×10$^5$ to 3.8×10$^5$ particles per cm$^3$ through the filter for up to 72 hours. Fractional filtration efficiencies are measured periodically and reported in units of percentage.

Nanoweb Preparation

For all examples a solution of polymer in formic acid was spun by electroblowing as described in WIPO publication WO 03/080905. Unless otherwise stated a 24% by weight solution of polymer in formic acid was used for electroblowing. Polymer used was polyamide-6,6 (PA66) (Zytel 3218, Du Pont, Wilmington, Del.). Following web laydown, the webs were dried in heated air at 80° C. unless otherwise stated. Voltage applied to the spinneret was 85 kV. Additional process conditions are described in the specific examples.

Pleating

The webs were pleated using either a blade pleating machine or a rotary pleating machine. The pleating machines typically include a heated zone to stabilize pleats under temperature and pressure. The specific process conditions are described in the examples.

The following examples were prepared to illustrate the invention.

Example 1

A nanoweb structure was prepared using the electroblowing process and was collected under vacuum onto 75 gsm spunbonded polyester scrim (Kolon). A nanoweb of basis weight 0.9 gsm was produced.

The fine fibers had an average fiber diameter of 0.3 microns and the thickness of the fine fiber layer was approximately 5 microns (0.005 mm). The thickness of the combined layers was 0.25 mm. The flat sheet resistance was 1.1 mm W.G. as measured at 5.3 cm/s air velocity.

The combined layer of media was pleated using a blade pleater and assembled into a cabin air panel filter. The pleat height was 28 mm and the pleat spacing was 5 mm. The dimension of the filter was 22.5 cm in length and 10.8 cm in width. The resistance of filter was measured in an air duct per ISO Test Specification 11155-1 and the result was 32 Pa at a flow rate of 170 m$^3$/h.

Comparative Example 1

Comparative Example 1 used a melt-blown media of scrim-meltblown-scrim (SMS) configuration. The meltblown fiber had an average fiber diameter of 7 microns and the thickness of the layer was 0.44 mm. The upstream scrim layer was a 110 gsm spunbonded polyester scrim and the downstream scrim layer was a spunbonded polypropylene scrim. The overall media thickness was 0.80 mm. The flat sheet resistance was 0.7 mm W.G. as measured at 5.3 cm/s air velocity. The media was pleated and assembled into filters of identical configuration as described in Example 1 and tested accordingly. The resistance of filter was 37 Pa at a flow rate of 170 m$^3$/h.

The filter resistance in Example 1 was 14% lower than Comparative Example 1, even though the flat sheet resistance was 57% higher.

Examples 2-3

Web structures of Examples 2 and 3 were prepared according to similar procedures as described in Example 1. Polymer throughput and line speed were adjusted to change the fine fiber size and the basis weight of the web. In both examples, two scrim-nanofiber (SN) web structures were made, with the scrim being 75 gsm spunbonded polyester (Kolon) for the first web and 30 gsm spunbonded polyester (Kolon) for the second web. The two web structures were ultrasonically bonded into a composite layer of SN-NS configuration. Detailed properties of Examples 2-3 are summarized in Table 1.

TABLE 1

|  | Example 1 | Example 2 | Example 3 | Comp. Ex. 1 |
|---|---|---|---|---|
| Composite layers | SN | SN-NS | SN-NS | SMS |
| Fine fiber size (micron) | 0.3 | 0.6 | 0.3 | 7 |
| Basis weight of fine fiber layers (gsm) | 0.9 | 1.0, 1.0 | 1.2, 1.6 | 35 |
| Thickness of fine fiber layers (microns) | 5 | 6, 6 | 7, 10 | 440 |
| Thickness of combined layers (mm) | 0.24 | 0.34 | 0.34 | 0.8 |
| Pleat spacing (mm) | 5 | 5 | 5 | 5 |
| Combined layer thickness to pleat spacing ratio | 0.05 | 0.07 | 0.07 | 0.16 |
| Flat sheet resistance (mm WG) | 1.1 | 1.3 | 2.4 | 0.7 |
| Filter Resistance (Pa) | 32 | 40 | 65 | 37 |

FIG. 1 shows the plot of filter resistance versus flat sheet resistance for Examples 1-3 and Comparative Example 1. The figure shows that for a given filter resistance, the flat sheet resistance of the construction can be higher with the web of the invention than for the melt blown web of the Comparative Example. The significance of this is two-fold: (1) A higher resistance and, therefore, higher efficiency filter medium of the invention can be used to achieve higher filter efficiency without exceeding filter resistance target; or (2) A lower filter resistance can be achieved with the web of the invention, without sacrificing filter efficiency.

Example 4

A nanoweb structure was prepared using the electroblowing process and was collected onto 65 gsm dry-laid, resin-bonded polyester scrim (Ok Soo). The basis weight of the nanoweb produced was 3.8 gsm.

The fine fibers of the nanoweb had an average fiber diameter of 0.3 microns and the thickness of the fine fiber layer was approximately 23 microns. The thickness of the combined layers was 0.55 mm. The flat sheet resistance was 3.6 mm W.G. as measured at 5.3 cm/s air velocity.

The combined media was pleated using a rotary pleater and glued to supporting polyester side walls to form pleated filter packs. The pleat height was 29 mm and the pleat spacing was 5 mm. The media thickness to pleat spacing ratio was 0.11. The dimension of the filter pack was 550 mm in length and 275 mm in width. Eight filter packs were fit into plastic frames and assembled into a HVAC 4V-bank filter of a nominal dimension of 610 mm (length)×610 mm (width)×305 mm (depth). The resistance of the HVAC filter was measured in a horizontal duct per ASHRAE 52.2 Test Standard and the result was 80 Pa (0.32 in WG) at a flow rate of 3344 m³/h (1968 ft³/min).

Comparative Example 2

A conventional melt-blown media was used for comparative purposes. The melt-blown fibers had an average fiber diameter of about 3 microns. The thickness of the melt-blown layer was 0.32 mm (320 microns) and the overall media thickness was 0.78 mm. The flat sheet resistance was 2.7 mm W.G. as measured at 5.3 cm/s air velocity.

The media was pleated into filter packs with pleat spacing of 5 mm. The media thickness to pleat spacing ratio was 0.16. The packs were assembled into a V-bank filter and tested per ASHRAE 52.2 Test Method. The filter resistance was 80 Pa (0.32 in WG) at a flow rate of 3344 m³/h (1968 ft³/min).

The filter in Example 4 had the same resistance as the filter in Comparative Example 2, even though the flat sheet resistance was 33% higher (3.6 mm vs. 2.7 mm W.G.).

Example 5

In a further example of the effectiveness of the filter of the invention, Example 5 was prepared according to procedures described in Example 4. The only differences were: the sample was collected onto 100 gsm dry-laid, resin-bonded polyester scrim (Ok Soo, Korea) and the basis weight of the nanoweb produced was 4.5 gsm. The assembled V-bank HVAC filter was compared in filtration performance with commercial filters made of charged media, using the KCl aerosol conditioning steps described earlier. The commercial samples tested were a rigid cell box filter made with a melt blown media (Purolator Model DC95-4412K) and a V-bank HVAC filter (Viledon MV95) filter.

Figure 2:
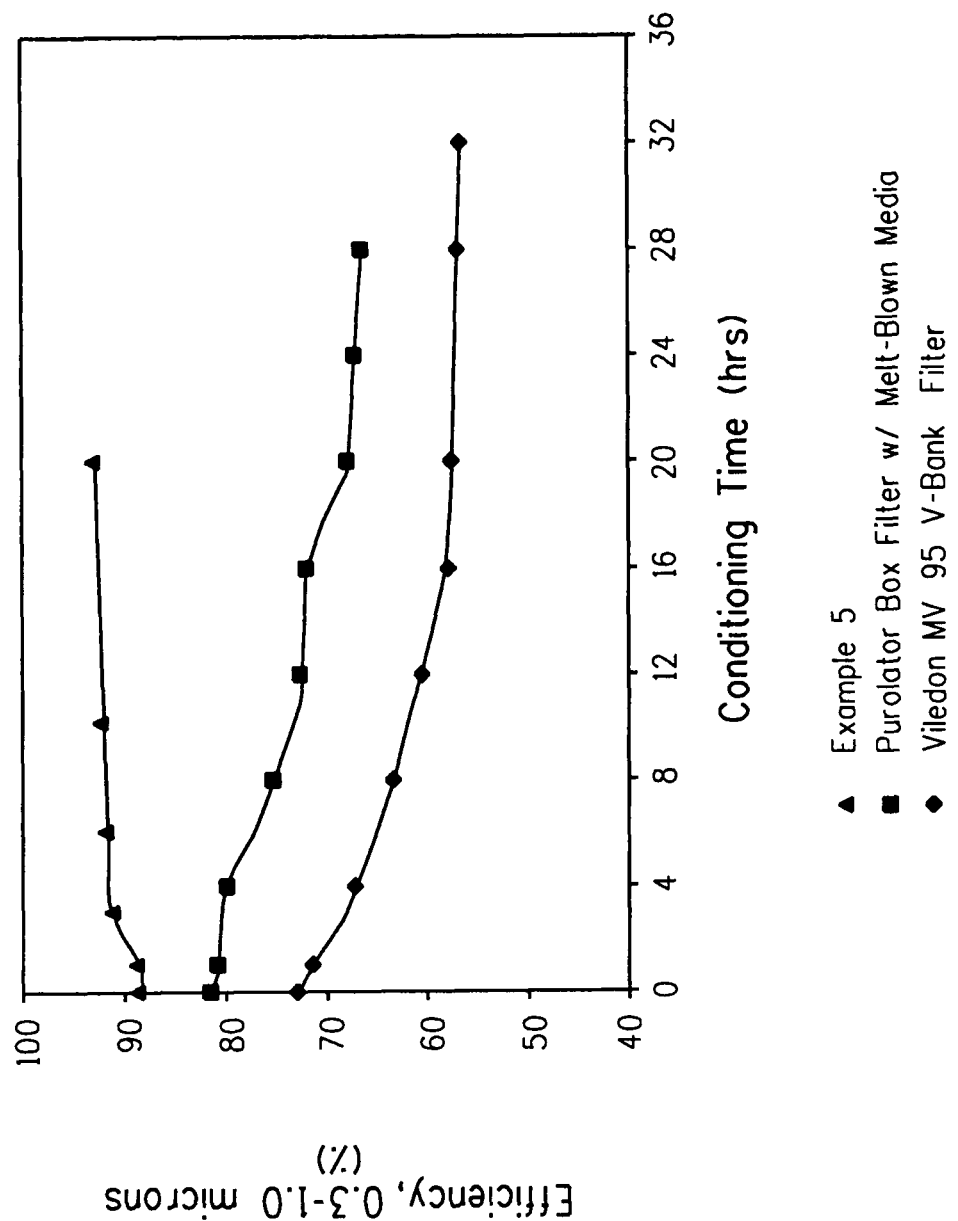
FIG. 2 shows plots of efficiency versus time for the filter of the invention and certain commercial charged media.

FIG. 2 shows the effectiveness of the filter of the invention in retaining efficiency when in use. The filter of the invention can be expected to maintain its efficiency for at least 20 hours under the accelerated conditions of loading with very fine potassium chloride aerosol.

We claim:

1. A filter comprising a filter medium with a pleated structure comprising a nanoweb layer and a scrim, wherein the nanoweb layer comprises fibers with a number average diameter less than 1 micron and layer thickness less than 50 microns, wherein the ratio of total medium thickness-to-pleat-spacing is less than 0.15, wherein the nanoweb layer has a basis weight of more than about 0.6 gsm and wherein the scrim is a nonwoven layer made of fibers selected from the group consisting of spunbond fibers, dry-laid fibers, wet-laid fibers, cellulose fibers, melt blown fibers, glass fibers, and blends thereof.

2. The filter of claim 1 in which the ratio of total medium thickness-to-pleat-spacing is less than 0.12.

3. The filter of claim 1 in which the ratio of total medium thickness-to-pleat-spacing is less than 0.08.

4. The filter of claim 1 in which the scrim is bonded to the nanoweb layer.

5. The filter of claim 1 in which the ratio of filter resistance to the flat sheet resistance of the medium is less than about 35 Pa/mm where flat sheet resistance is measured at an air flow rate of 5.3 cm/s and is reported in units of mm water gauge and filter resistance is measured at an air flow rate of 3344 m³/h and is reported in units of inch water gauge and converted to units of Pascal.

6. The filter media of claim 1 in which the filter efficiency does not decrease over a 20 hour treatment after application of a loading of 0.02 micron potassium chloride aerosol at a density of $3.6 \times 10^5$ to $3.8 \times 10^5$ particles per $cm^3$ at an air flow rate of 3344 $m^3$/h.

\* \* \* \* \*